United States Patent [19]

Bales et al.

[11] Patent Number: 5,045,610

[45] Date of Patent: Sep. 3, 1991

[54] BLEND OF COPOLYESTERCARBONATE POLYMER DERIVED FROM DIARYL DICARBOXYLIC ACID

[75] Inventors: Stephen E. Bales; Kenneth A. Burdett; Guo-Shuh J. Lee, all of Midland, Mich.

[73] Assignee: The Dow Chemical Company, Midland, Mich.

[21] Appl. No.: 401,213

[22] Filed: Aug. 31, 1989

[51] Int. Cl.$^5$ .................. C08L 67/02; C08L 69/00; C08G 63/64

[52] U.S. Cl. .................. 525/439; 525/165; 525/440; 525/444; 525/445; 528/125; 528/128; 528/176; 528/191; 528/192; 528/193; 528/194; 528/195

[58] Field of Search .............. 528/176, 191, 192, 193, 528/194, 195, 125, 128; 525/165, 439, 440, 444, 445

[56] References Cited

U.S. PATENT DOCUMENTS

| | | | |
|---|---|---|---|
| 3,220,976 | 11/1965 | Goldberg | 260/47 |
| 4,340,718 | 7/1982 | Zannucci et al. | 528/128 |
| 4,617,368 | 10/1986 | Freitag et al. | 528/176 |
| 4,710,547 | 12/1987 | Uryu et al. | 525/437 |
| 4,726,998 | 2/1988 | Ikenaga et al. | 428/480 |

OTHER PUBLICATIONS

"The Flexibility of Various Molecular Swivels Used to Control the Rigidity and Tractability of Aromatic Heterocyclic Polymers", by W. J. Welsh et al., (J. Macromol. Sci.-Phys., B20(1), 59-84, (1981)).

Primary Examiner—Harold D. Anderson

[57] ABSTRACT

This invention relates to copolyestercarbonate polymers which are prepared with diaryl dicarboxylic acid compounds, particularly biphenyldicarboxylic acid compounds. Such copolyestercarbonate polymers show good physical properties including high glass transition temperatures and low ultraviolet radiation sensitivity. The thermoplastic copolymestercarbonates can be used to prepare films or molded articles or blended with other thermoplastic resins to give thermoplastic polymer blends for molding purposes.

15 Claims, No Drawings

BLEND OF COPOLYESTERCARBONATE POLYMER DERIVED FROM DIARYL DICARBOXYLIC ACID

FIELD OF THE INVENTION

This invention relates to copolyestercarbonate polymers, resins, and more particularly to such polymers prepared from a diaryl dicarboxylic acid compound.

BACKGROUND OF THE INVENTION

A wide variety of polycarbonate and copolyestercarbonate resins are known and usefully employed as thermoplastics for a variety of molded articles and components. In spite of the wide diversity of physical properties associated with the known resins, there remains a need for even more diverse physical properties.

For some of today's current applications it is desirable to provide copolyestercarbonate resins with improved physical properties including increased tensile and impact properties, improved hydrolytic and solvent resistance and reduced sensitivity to UV radiation.

Typically, copolyestercarbonate resins are prepared by reacting a dihydroxy compound with a dicarboxylic acid compound and a carbonate precursor. The dicarboxylic acid compounds most commonly employed are those of terephthalic acid and isophthalic acid.

SUMMARY OF THE INVENTION

We have now discovered that the desirable improvements in such physical properties of copolyestercarbonate polymer resins can be obtained by using alternative dicarboxylic acid compounds.

In one aspect, this invention is a copolyestercarbonate polymer prepared by contacting a dihydroxy compound with a dicarboxylic acid compound and a carbonate precursor characterized in that (a) at least 50 mole percent of the dicarboxylic acid compound employed comprises a diaryl dicarboxylic acid compound containing two or more aromatic rings which are connected together by a positionally and angularly well defined rigid internal linking group, and (b) the mole ratio of dicarboxylic acid compound to carbonate precursor is such that the polymer has a molar ratio of diester:carbonate groups from about 0.02:1 to about 20:1.

In another aspect, this invention is a thermoplastic polymer blend comprising a thermoplastic polymer and a copolyestercarbonate polymer characterized in that the copolyestercarbonate polymer is prepared by contacting a dihydroxy compound with a dicarboxylic acid compound and a carbonate precursor wherein (a) at least 50 mole percent of the dicarboxylic acid compound employed comprises a diaryl dicarboxylic acid compound containing two or more aromatic rings which are connected together by a positionally and angularly well defined rigid internal linking group, (b) the mole ratio of dicarboxylic acid compound to carbonate precursor is such that the polymer has a molar ratio of diester:carbonate groups from about 0.02:1 to about 20:1 and (c) in that the polymer blend contains at least 0.5 weight percent of the said copolyestercarbonate by total weight of thermoplastic polymer and copolyestercarbonate polymer present.

Surprisingly, it has been found that the polymers of the present invention exhibit improved properties including impact strengths, glass transition temperatures, and reduced ultraviolet radiation sensitivity. Even more surprisingly, it has been found that the polymers of the present invention may be used, for example, in preparing films where the thickness of the film prepared can be greater than that for other polymers in the prior art without the problem of a crystallinity buildup.

DETAILED DESCRIPTION OF THE INVENTION

As described hereinabove, this invention is a copolyestercarbonate polymer prepared by contacting a dihydroxy compound with a dicarboxylic acid compound and a carbonate precursor. The polymer is characterized in that the mole ratio of dicarboxylic acid compound and carbonate precursor with respect to the dihydroxy compound is such that the resulting polymer has a molar ratio of diester:carbonate groups from about 0.02:1 to about 20:1, preferably from about 0.05:1 to about 15:1 and more preferably from about 0.06:1 to about 10:1. The optimum ratio of diester groups to carbonate groups in the copolyestercarbonate polymer depends on the intended application of the polymer and should be determined by trial and error. Diester groups originate from the reaction of the dihydroxy compounds with the dicarboxylic acid compound, and carbonate groups from the reaction of the dihydroxy compound and carbonate precursor.

The polymer is further characterized in that of the total dicarboxylic acid compound employed to prepare the polymer, at least about 50 mole percent, preferably at least about 70 mole percent and more preferably at least about 85 mole percent is a diaryl dicarboxylic acid compound containing two aromatic rings which are connected together by a positionally and angularly well defined rigid internal linking group.

The rigid internal linking group confers a rod-like geometry to the diaryl dicarboxylic acid compound. Exemplary of such rigid internal linking groups are a covalent bond, a cycloaliphatic or heterocyclic ring (wherein preferably the aryl groups of the dicarboxylic acid are associated with the same atom center of the ring), —C=C—, —C≡C—, —COO—, —NHCO—, —NHCOO—, —C=N—, —C=C=C—,

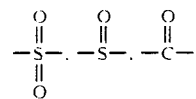

and —N=C=N—. The preferred rigid internal linking group for the copolyestercarbonate polymers of the present invention is a covalent bond.

The diaryl dicarboxylic acid compound is a dicarboxylic acid, a dicarboxylic chloride or mixtures thereof. Each aryl ring is substituted by at least one carboxylic acid or carboxylic acid chloride group. In addition, the aryl aromatic rings are optionally and independently substituted with from 1 to 4 substituents exemplary of which when not hydrogen are halogen, $C_{1-6}$ alkyl groups, oxy-$C_{1-6}$ alkyl groups, oxyaryl, phenyl, benzyl, or mixtures thereof Preferred substituents for the present invention when not hydrogen are chlorine, bromine, $C_{1-6}$ alkyl groups, especially methyl, though it is most preferred when none of these substituents are present on the aryl ring.

Exemplary of suitable diaryl dicarboxylic acid compounds for use in the present invention include 4,4'-biphenyldicarboxylic acid, 3,4'-biphenyldicarboxylic acid, 4,4'-biphenyldicarboxylic acid chloride, 3,4'- biphenyldicarboxylic acid chloride and mixtures thereof. Especially preferred are the 4,4'-dicarboxylic acid and acid chloride isomers. The remaining mole fraction of dicarboxylic acid compound required, if any, for preparing the polymer can be composed of one or more suitable dicarboxylic acids or dicarboxylic acid chlorides, different than the diaryl dicarboxylic acid compound described hereinabove, and familiar to one skilled in the art of preparing polyester polymers.

Suitable dicarboxylic acid compounds can be aliphatic, alicyclic, heterocyclic, aromatic, or mixtures thereof. Hydroxy acids may also be used in small quantities in the preparation of the polymers of this invention.

Suitable aliphatic dibasic acids are those derived from straight-chain paraffin hydrocarbons such as oxalic, malonic, dimethyl malonic, succinic, glutaric, adipic, pimelic, subaric, azelaic, and sebacic acid. Also included are the halogen-substituted aliphatic dibasic acids. Aliphatic carboxylic acids containing heteroatoms and their aliphatic chain, such as thiodiglycollic or diglycollic acid may also be used. Also useful are such unsaturated acids as maleic or fumaric.

Suitable alicyclic dicarboxylic acids include trans-1,4-cyclohexanedicarboxylic acid, cis-1,4-cyclohexanedicarboxylic acid, and 1,3-cyclohexanedicarboxylic acids: and alkyl-, alkoxy-, or halogen-substituted derivatives of the above said alicyclic dicarboxylic acids.

Aromatic dicarboxylic acids suitable for use in the making of polymers of the present invention include terephthalic acid, 4,4'-triphenyldicarboxylic acid, 2,6-naphthalenedicarboxylic acid, biphenylether-4,4'-dicarboxylic acid, diphenoxyethane-4,4'-dicarboxylic acid, diphenoxybutane-4,4'-dicarboxylic acid, biphenylethane-4,4'-dicarboxylic acid, isophthalic acid, biphenylether-3,3'-dicarboxylic acid, diphenoxyethane-3,3'-dicarboxylic acid, biphenylethane-3,3'-dicarboxylic acid, naphthalene-1,6-dicarboxylic acid and 1,5-anthraquinonedicarboxylic acid: and alkyl-, alkoxy-, or halogen-substituted derivatives of the above said aromatic dicarboxylic acids such as chloro terephthalic acid, dichloro terephthalic acid, bromo terephthalic acid, methyl terephthalic acid, dimethyl terephthalic acid, ethyl terephthalic acid, methoxy terephthalic acid and ethoxy terephthalic acid.

Examples of hydroxy acids are hydroxy glutaric acid, mandelic acid, the various isomers of hydroxy benzoic acid, hydroxy biphenyl carboxylic acid, and the like.

The mono- and diacid chloride derivatives of the above-mentioned dicarboxylic acids are also suitable for preparing the polymers of the present invention. Further examples of suitable dicarboxylic acid compounds or hydroxy carboxylic acid compounds are given in U.S. Pat. Nos. 3,637,595; 3,975,487: and 4,118,372, the relevant parts of which are herein incorporated by reference. When the diaryl dicarboxylic acids are used in combination with other suitable dicarboxylic acids, preferred are the above-mentioned aromatic carboxylic acids.

The dihydroxy compound used in preparing the copolyestercarbonate polymer of the invention can be an aliphatic, alicyclic, heterocyclic or aromatic dihydroxy compound which has two hydroxyl groups capable of reacting with the carboxylic acid or acid chloride and carbonate precursor to give the polymer of the present invention. Combinations of one or more of these dihydroxyl compounds can be used to make the copolyestercarbonate polymers.

It is preferred for this present invention that the dihydroxy compound employed comprises at least about 50 mole percent, preferably at least about 70 mole percent and most preferably from about 90 to about 100 mole percent of a dihydroxy diaryl compound. The dihydroxy diaryl compound is represented by the formula

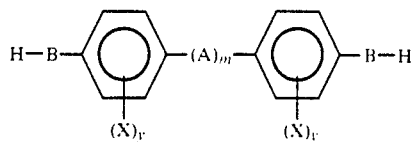

wherein A is selected from the group consisting of a divalent hydrocarbon containing from one to about 15 carbon atoms, a halogen-substituted divalent hydrocarbon radical containing from one to about 15 carbon atoms and divalent groups such as —S—, —S—S—, —O—, —C=C—, —C=N—,

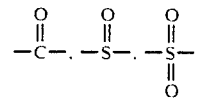

a covalent bond or any other rigid linking group as defined hereinabove: B independently is oxygen. sulfur or a divalent radical such as —ORO—. wherein R is a $C_{1-6}$ hydrocarbon: X, when not hydrogen, is independently selected from the group consisting of halogen, a monoselected valent hydrocarbon radical such as an alkyl group or from one to about 6 carbon atoms, an aryl group of from about 6 to 18 carbon atoms, an aralkyl group of from about 7 to about 14 carbon atoms, an oxyalkyl group of from one to about 6 carbon atoms, and an oxyaryl group of from about 6 to about 18 carbon atoms: m is 0 or 1 and y is a whole number integer of from 0 to 4.

Typical of some of the dihydroxy diaryl compounds that are advantageously employed are bisphenols such as bis(4-hydroxyphenyl)methane, 1,1-bis(4-hydroxyphenyl)-1-phenylethane, 2,2-bis(4-hydroxyphenyl)propane (also commonly known as bisphenol A), 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane: dihydroxyphenyl ethers such as bis(4-hydroxyphenyl)ether, bis(3,5-dichloro-4-hydroxyphenyl)ether; dihydroxy biphenyls such as 4,4'-dihydroxybiphenyl, 3,3'-dichloro-4,4'-dihydroxy biphenyl, 2,2',6,6'-tetrabromo-3,3',5,5'-tetra-dichloro-4-hydroxyphenyl)ether; dihydroxy aryl sulfones such as bis(4-hydroxyphenyl)sulfone, bis(3,5-dimethyl-4-hydroxyphenyl)sulfone: and dihydroxy biphenyl sulfides and sulfoxides such as bis(4-hydroxyphenyl)sulfide and bis(4-hydroxyphenyl)sulfoxide; or mixtures thereof.

The preferred dihydroxy diaryl compounds are the bisphenol compounds, especially the 4,4'-bisphenols optionally substituted by a halogen or a $C_{1-6}$ hydrocarbon radical and biphenyl compounds. Exemplary of such diaryl dihydroxy compounds are 2,2-bis(4-hydroxyphenyl)propane, 1,1-bis(4-hydroxyphenyl)-1-phenylethane, 2,2',6,6'-tetrabromo-3,3',5,5'-tetramethyl-4,4'-dihydroxybiphenyl, 2,2-bis(4-hydroxy-3,5-dichlorophenyl) propane, 2,2-bis(4-hydroxy-3,5-dibromophenyl)propane, 4,4'-dihydroxybiphenyl and bis(4-hydroxyphenyl)sulfide also referred to as 4,4'-thiodiphenol.

The remaining portion of dihydroxy compound required in the reaction of preparing the copolyestercarbonate polymer of the present invention may be composed of a dihydroxy diaryl compound different from the preferred compounds described hereinabove or it may consist of one or more aliphatic, alicyclic or aromatic diols commonly used in the preparation of polyester or polycarbonate polyols.

Suitable diols are aliphatic diols including straight-chain and branched aliphatic diols such as ethylene glycol, propylene glycol, butylene glycol, and neopentyl glycol: alicyclic diols such as trans-1,4-cyclohexanediol, cis-1,4-cyclohexanediol, trans-1,4-cyolohexanedimethanol, cis-1,4-cyclohexanedimethanol, trans-1,3-cyclohexanedimethanol: and alkyl-, alkoxy-, or halogen-substituted derivatives of the above said alicyclic diols such as trans-1,4-(1-methyl)cyclohexanediol and trans-1,4-(1-chloro)cyclohexanediol.

Suitable aromatic diols include hydroquinone, resorcinol, 2,6-naphthalenediol, 1,6-naphthalenediol. A variety of additional aromatic diols are also available and are disclosed in U.S. Pat. Nos. 2,999,835: 3,028,365 and 3,153,008, the relevant parts of which are incorporated herein by reference.

It is also possible to use, in addition to the aromatic diols, aromatic mercaptophenols, aromatic hydroxy amines and aromatic diamines. Exemplary of such compounds are benzene-1,4-dithiol, benzene-1,3-dithiol, 2,6-naphthalenedithiol, 2,7-naphthalenedithiol, 4-mercaptophenol, 3-mercaptophenol, 6-mercaptonaphthol, 7-mercaptonaphthol, 4-aminophenol, n-methyl-4-aminophenol, 1,4-phenyldiamine, 3-aminophenol, 3-methyl-4-aminophenol, 2-chloro-4-aminophenol, 4-amino-1-naphthol, 4-amino-4'-hydroxybiphenyl, mixtures thereof, and the like. Additional aromatic hydroxy amines and aromatic diamines are disclosed in U.S. Pat. No. 4,726,998 herein incorporated by reference.

The carbonate precursor may be either a carbonyl halide, a diaryl carbonate or a bishaloformate. The carbonyl halides include carbonyl bromide, carbonyl chloride and mixtures thereof. The bishaloformates suitable for use include the bishaloformates of dihydric phenols such as bischloroformates of 2,2-bis(4-hydroxyphenyl)-propane, 2,2-bis(4-hydroxy-3,5-dichlorophenyl)propane, hydroquinone and the like or bishaloformates of glycols such as ethylene glycol and the like. While all of the above described carbonate precursors are useful, carbonyl chloride, also known as phosgene, is preferred.

The copolyestercarbonate polymers of the present invention may be obtained by various known processes using solution or interfacial polymerization techniques such as described, for example, in the *Encyclopedia of Polymer Science and Technology,* 1969, Vol. 10, p. 726 and the publication "Polyester", Pergamon Press (1965) p. 448 et seq. Exemplary of methods by which copolyestercarbonates may be produced are those methods described in U.S. Pat. Nos. 3,169,121: 4,105,633: 4,156,069: 4,194,038: 4,238,596: 4,238,597; 4,252,939; 4,255,556; 4,260,731: 4,287,787: 4,330,662: 4,355,150: 4,360,656: 4,369,303: 4,374,973; and 4,388,455; all of which are incorporated herein by reference.

The polymers of the invention may, in addition to being used for molding purposes, be employed as the base for preparing thermoplastic molding compositions by being compounded with conventional molding aids such as, for example, antioxidants, antistatic agents, inert fillers such as glass, talc, mica, clay, hydrolytic stabilizers such as the epoxides as disclosed in U.S. Pat. Nos. 3,489,716: 3,839,247: and 4,138,379: color stabilizers such as organophosphites, thermal stabilizers such as phosphites: flame retardants and mold release agents. The polymers of the invention show reduced sensitivity to UV radiation over those of the prior art but if required UV radiation absorbers such as benzophenones, benzotriazoles and the like can be incorporated into the thermoplastic molding composition.

The copolyestercarbonate polymers of the present invention can also be employed with other thermoplastic polymers to prepare thermoplastic polymer blends. Suitable thermoplastic polymers for this purpose include thermoplastic polyurethanes, polyesters, polycarbonates, polyalkylenes such as polypropylene and polyethylene, copolymers thereof and mixtures thereof.

When the copolyestercarbonate polymers of the present invention are used to prepare thermoplastic polymer blends, advantageously the blend comprises at least 0.5 weight percent, preferably at least 5 weight percent, and more preferably from about 10 to about 99 weight percent of said copolyestercarbonate polymer by total weight thermoplastic polymer and copolyestercarbonate polymer present.

ILLUSTRATIVE EMBODIMENTS

The following examples are given to further illustrate the invention as construed by the inventors. However, these examples are not to be interpreted as limiting the scope of the invention in any way. Unless stated otherwise, all parts and percentages are given by weight.

Where reported, the following tests are carried out to characterize the polymers of the invention using the test procedures as indicated. Inherent viscosity (IV) is determined in methylene chloride at 25° C. and using a concentration of 0.5 g/dL. The glass transition temperature (Tg) is determined by differential scanning calorimetry at a heating rate of 20° C./minute. The extrapolated onset value is reported.

The following tests are performed using compression molded specimens (0.125 inch thickness) prepared at about 80° C. to 120° C. above Tg. Notched Izod impact resistance is determined according to ASTM D-256, wherein a 0.01-inch notch radius is employed. Tensile properties including tensile modulus (TM), tensile strength at yield (TY), elongation at yield (EY), and post-yield stress drop (PYSD) are measured according to ASTM D-638. The determination of PYSD is described by Bubeck et al. in *Polymer Engineering and Sciene,* 24, 1142 (1984). Specific gravity (SG) is measured by ASTM D-792. Resistance to hydrolysis is determined by measuring the weight loss resulting from immersion in 10N NaOH solution. The critical strain for crazing is determined after a 30-minute exposure period according to the procedure of Wyzgoski, *General Motors Research Publication* GMR-3779 (1981).

The sensitivity of the polymer to ultraviolet (UV) radiation is determined by measuring the change in yellowness index (YI) of compression moldings after exposure to a Hanovia 450W medium pressure mercury arc lamp or a QUV testing chamber. YI is determined according to ASTM D-1925.

EXAMPLE 1

This example describes the synthesis of a bisphenol A/4,4'-biphenyldicarboxylate copolyestercarbonate having a diester:carbonate molar ratio of 1.0:1.

A two-liter (L) flask equipped with a thermometer, nitrogen and phosgene inlets, and a paddle stirrer connected to a Cole Parmer Servodyne is charged with 99.44 g (0.436 mole) of bisphenol A, 89.7 g (1.134 mole) of pyridine, and 1.18 L of methylene chloride. The resulting clear solution is stirred at 300 rpm, cooled to about 16° C., and then 60.79 g (0.218 mole) of 4,4'-biphenyldicarboxylic acid chloride is added to the flask over a period of about 4 minutes, resulting in an exotherm to about 20° C. The clear solution is stirred for 10 minutes, 1.64 g (0.011 mole) of p-tertiary-butylphenol is added, and then 22.5 g (0.23 mole) of phosgene is added to the flask over 15 minutes, while maintaining the contents of the flask at 14° C. to 29° C. Methanol (3 mL) and HCl (3N, 160 mL) are added, the contents of the flask are stirred an additional 30 minutes, and then poured into a 2-L separatory funnel. The methylene chloride phase containing the copolyestercarbonate is separated, washed again using 215 mL of 0.5N HCl, and then passed through a column (300-mL bed volume) of macroporous cation-exchange resin. The polymer is then isolated by adding one volume of the methylene chloride solution to a mixture of 2.4 volumes of hexane and 1.2 volumes of acetone in an explosion-resistant blender, and then collecting the resulting precipitated product by filtration.

The precipitated product is then dried in a vacuum oven at about 120° C. for 48 hours. The resulting product weighs 136.5 g, has an IV of 0.72 dL/g, and exhibits a diester:carbonate ratio of 1.0:1 as determined by nuclear magnetic resonance and infrared spectroscopy. This material is designated Sample No. 1.

For purposes of comparison, the general procedure of this example is employed to prepare a bisphenol A/terephthalate copolyestercarbonate polymer having a diester:carbonate ratio of 1.0:1. For this comparison material, designated Sample No. C1, terephthaloyl chloride is employed instead of 4,4'-biphenyldicarboxylic acid chloride.

The properties determined for Samples No. 1 and C1 are set forth in Table I. As can be seen from these results, the compositions according to the present invention exhibit improvements in Tg, Notched Izod, tensile properties, hydrolytic stability and solvent resistance when compared to comparative compositions.

TABLE I

| Sample No. | 1 | C1* |
|---|---|---|
| IV (dL/g) | 0.72 | 0.68 |
| Tg (°C.) | 204 | 186 |
| N. Izod (ft-lb/in) | 6.7 | 5.0 |
| TY (psi) | 9,219 | 9,042 |
| EY (%) | 10.0 | 8.6 |
| PYSD (%) | 4.8 | 8.1 |
| TM ($10^5$ psi) | 3.3 | 3.3 |
| Weight Loss in 10N NaOH (%, 500 hr) | 3.4 | 13.7 |
| Critical Strain, Isopropanol (%) | 3.0 | 2.0 |
| SG | 1.20 | 1.20 |

*Not an example of the invention

EXAMPLE 2

To further describe the scope of this invention, additional bisphenol A/4,4'-biphenyldicarboxylate copolyestercarbonate polymers having diester:carbonate molar ratios from 0.06:1 to 10:1 are prepared according to the general procedure of Example 1. These results are recorded in Table II.

The molecular weight of the resulting polymer is observed through the inherent viscosities (IV). Higher inherent viscosity values indicate polymer with greater molecular weight. Examples 2 to 11 are prepared so as to have the inherent viscosities as reported in Table II.

In Samples 4 and 5, and Examples 6 and 7, the different inherent viscosities are obtained by using different quantities of p-tertiary-butylphenol. Smaller quantities provide for higher molecular weights as evidenced by greater inherent viscosities.

TABLE II

| Sample No. | DE:C[1] | IV (dL/g) | Tg (°C.) | N. Izod (ft-lb/in) | TY (psi) | EY (%) | PYSD (%) | TM ($10^5$ psi) |
|---|---|---|---|---|---|---|---|---|
| 2 | 0.06 | 0.55 | 162 | 15.5 | 8,943 | 6.5 | 20.2 | 3.4 |
| 3 | 0.13 | 0.55 | 167 | 12.2 | 9,074 | 7.0 | 17.5 | 3.4 |
| 4 | 0.33 | 0.52 | 175 | 9.4 | 9,040 | 7.5 | 13.5 | 3.3 |
| 5 | 0.33 | 0.66 | 179 | 8.5 | 8,952 | 7.8 | 12.3 | 3.3 |
| 6 | 0.50 | 0.61 | 185 | 8.2 | 9,319 | 8.6 | 10.0 | 3.4 |
| 7 | 0.50 | 0.89 | 192 | 6.9 | 9,104 | 9.0 | 8.2 | 3.3 |
| 8 | 1.50 | 0.59 | 207 | 5.1 | 9,724 | 11.0 | 3.1 | 3.4 |
| 9 | 3.00 | 0.69 | 220 | 3.7 | 9,458 | 12.5 | 0.3 | 3.3 |
| 10 | 5.00 | 0.75 | 227 | ND | ND | ND | ND | ND |
| 11 | 10.00 | 0.58 | ND | ND | ND | ND | ND | ND |

[1] Diester:carbonate molar ratio
ND - Not determined

EXAMPLE 3

To further describe the utility of this invention, bisphenol A/4,4'-biphenyldicarboxylate (BP) copolyestercarbonate polymers are exposed to UV radiation, as shown in Table III (Sample Nos. 1, 4, 12). For comparison, bisphenol A/terephthalate (T) copolyestercarbonate polymers are also exposed (Sample Nos. C1–C3). Sample Nos. 12, C2 and C3 are prepared according to the general procedure of Example 1. As evidenced by the resulting change in YI (ΔYI), the compositions of the present invention exhibit a significant reduction in yellowing following UV exposure.

TABLE III

| Sample No. | DE:C | Ester Type | UV Source | Exposure Time (hr) | ΔYI |
|---|---|---|---|---|---|
| 1 | 1.00 | BP | QUV | 2,000 | 2.8 |
| C1* | 1.00 | T | QUV | 2,000 | 7.9 |
| 4 | 0.33 | BP | H** | 5 | 1.9 |
| C2* | 0.33 | T | H | 5 | 6.6 |
| 12 | 0.50 | BP | H | 8 | 2.6 |
| C3* | 0.50 | T | H | 8 | 7.8 |

*Not an example of the invention
**Hanovia 450 W lamp

EXAMPLE 4

To further describe the scope of this invention, additional copolyestercarbonate polymers are prepared according to the general procedure of Example 1. Diols utilized for the compositions of this example include bisphenol A (BA): 2,2-bis(4-hydroxy-3,5-dichlorophenyl)propane (TCBA): 2,2-bis(4-hydroxy-3,5-dibromophenyl)propane (TBBA): 4,4'-dihydroxybiphenyl (DHB): 4,4'-thiodiphenol (TDP): 1,1-bis(4-hydroxyphenyl)-1-phenylethane (also known as bisphenol AP, BAP): and 2,2',6,6'-tetrabromo-3,3',5,5'-tetramethyl-4,4'-dihydroxybiphenyl (TTDHB). Esters utilized include 4,4'-biphenyldicarboxylate (BP), terephthalate (T), and isophthalate (I). The results for these compositions are set forth in Table IV (Sample Nos. 13–22).

TABLE IV

| Sample No. | Diol¹ | Ester Type¹ | DE:C | IV (dL/g) | Tg (°C.) |
|---|---|---|---|---|---|
| 13 | BA | BP/T (80/20) | 0.33 | 0.54 | 177 |
| 14 | BA | BP/T (50/50) | 0.33 | 0.51 | 174 |
| 15 | BA | BP/I (80/20) | 0.33 | 0.53 | 175 |
| 16 | BA | BP/I (50/50) | 0.33 | 0.54 | 171 |
| 17 | BA/TCBA (70/30) | BP | 0.33 | 0.51 | 192 |
| 18 | BA/TBBA (80/20) | BP | 0.33 | 0.45 | 192 |
| 19 | BA/DHB (70/30) | BP | 0.50 | 0.63 | 200 |
| 20 | BA/TDP (50/50) | BP | 0.33 | 0.51 | 157 |
| 21 | BA/TTDHB (90/10) | BP | 0.50 | 0.50 | 199 |
| 22 | BAP | BP | 1.00 | 0.54 | 223 |

¹ The molar ratio is shown in parentheses

EXAMPLE 5

To further describe the scope of this invention, this example describes the preparation of a thermoplastic polymer blend of bisphenol A polycarbonate resin and a copolyestercarbonate polymer resin of the present invention.

Bisphenol A/4,4'-biphenyldicarboxylate copolyestercarbonate polymer (87.6 g, prepared according to the general procedure of Example 1 and having IV=0.56 dL/g and a diester:carbonate ratio of 1.0:1) is mixed with a bisphenol A polycarbonate polymer (32.4 g, IV=0.53 dL/g) in one liter of methylene chloride. The blend is then isolated by precipitation using hexane/acetone and an explosion-resistant blender. The precipitated product is dried in a vacuum oven and then compression molded. The following results are obtained for the molded blend composition: notched izod=7.7 ft-lb/in; TY =9,261 psi; EY =8.8 percent; PYSD =9.0 percent; and TM =300,000 psi.

EXAMPLE 6

An additional advantage of the composition of this invention is resistance to crystallization during the solvent-casting of films. The preparation of films of bisphenol A polycarbonates in a thickness of at least 0.005 inch by solvent-casting from a methylene chloride solution results in crystalline films, as evidenced by opacity and a melting transition (differential scanning calorimetry analysis). Non-crystalline films of comparative bisphenol A/terephthalate copolyestercarbonate polymers can be prepared when the diester:carbonate ratio is in the range of 0.05 to 1.5. In contrast, the corresponding diester:carbonate range for non-crystalline film preparation is from 0.05 to 10.0 for the bisphenol A/biphenyldicarboxylate copolyestercarbonate polymers of this invention.

What is claimed is:

1. A thermoplastic polymer blend comprising a thermoplastic polymer and a copolyestercarbonate polymer characterized in that the copolyestercarbonate polymer is prepared by contacting a dihydroxy compound with a dicarboxylic acid compound and a carbonate precursor wherein the (a) at least 50 mole percent of the dicarboxylic acid compound employed consists of a diaryl dicarboxylic acid compound containing two or more aromatic rings which are connected together by a positionally and angularly well defined rigid internal linking group, and (b) the mole ratio of dicarboxylic acid compounds to carbonate precursor is such that the polymer has molar ratio of diester:carbonate groups from about 0.02:1 to about 20:1 and in that the polymer blend contains at least 0.5 weight percent of the said copolyestercarbonate by total weight of thermoplastic polymer and copolyestercarbonate polymer present.

2. The thermoplastic polymer blend of claim 1 wherein the copolyestercarbonate polymer is prepared from a dihydroxy compound which is a bisphenol A, a diaryl dicarboxylic acid compound which is selected from a group consisting of biphenyldicarboxylic acid, biphenyldicarboxylic acid chloride and mixtures thereof and a carbonate precursor which is phosgene.

3. The thermoplastic polymer blend of claim 1 wherein the linking group is a covalent bond or is selected from the group consisting of a cycloaliphatic or heterocyclic ring, —C=C—, —C≡C—, —COO—, —NHCO—, —NHCOO—, —C=N—, —C=C=C—,

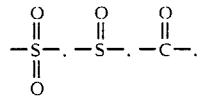

and —N=C=N—.

4. The thermoplastic polymer blend of claim 1 wherein the diaryl dicarboxylic acid compound is a dicarboxylic acid, a diacid chloride or mixtures thereof.

5. The thermoplastic polymer blend of claim 4 wherein the diaryl dicarboxylic acid compound is one or more selected from the group consisting of 4,4'-biphenyldicarboxylic acid, 3,4'-biphenyldicarboxylic acid, 4,4'-biphenyldicarboxylic acid chloride and 3,4'-biphenyldicarboxylic acid chloride.

6. The thermoplastic polymer blend of claim 1 wherein the dihydroxy compound is a diaryl dihydroxy compound.

7. The thermoplastic polymer blend of claim 6 wherein the diaryl dihydroxy compound is represented by

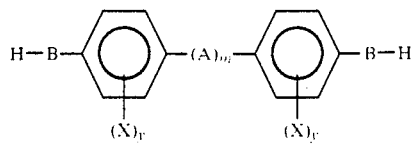

wherein A is selected from the group consisting of divalent hydrocarbon containing from one to about 15 carbon atoms, a halogen-substituted divalent hydrocarbon radical containing from one to about 15 carbon atoms, —S—, —S—S—, —O—, —C≡C—, —C≡N—,

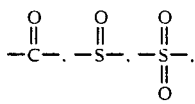

or A is a covalent bond; B independently is selected from the group consisting of oxygen, sulfur or —ORO—, wherein R is a $C_1$≠hydrocarbon; X is independently selected from the group consisting of hydrogen, halogen, an alkyl group of from one to about 6 carbon atoms, an aryl group of from about 6 to 18 carbon atoms, an aralkyl group of from about 7 to about 14 carbon atoms, an oxyalkyl group of from 1 to about 6 carbon atoms, and an oxyaryl group of from about 6 to about 18 carbon atoms; m is 0 or 1 and y is an integer of from 0 to 4.

8. The thermoplastic polymer blend of claim 6 wherein the diaryl dihydroxy compound is one or more selected from the group consisting of 2,2-bis(4-hydroxyphenyl)propane, 2,2',6,6'-tetrabromo-3,3',5,5'-tetramethyl-4,4'-dihydroxybiphenyl, 2,2-bis(4-hydroxy-3,5-dichlorophenyl) propane, 2,2-bis(4-hydroxy-3,5-dibromophynl)propane. 4,4'-dihydroxybiphenyl and bis(4-hydroxyphenyl)sulfide.

9. The thermoplastic polymer blend of claim 1 wherein the molar ratio of diester groups:carbonate groups is from about 0.05:1 to about 15:1.

10. The thermoplastic polymer blend of claim 9 wherein the molar ratio of diester groups:carbonate groups is from about 0.06:1 to about 10:1.

11. The thermoplastic polymer blend of claim 1 wherein the dicarboxylic acid compound consists of at least 70 mole percent of a diaryl dicarboxylic acid compound.

12. The thermoplastic polymer blend of claim 11 wherein the dicarboxylic acid compound consists of at least 85 mole percent of a diaryl dicarboxylic acid compound.

13. The thermoplastic polymer blend of claim 1 wherein the carbonate precursor is a carbonyl halide.

14. The thermoplastic polymer blend of claim 13 wherein the carbonyl halide is phosgene.

15. The thermoplastic polymer blend of claim 1 wherein the dihydroxy compound is a bisphenol, the diaryl dicarboxylic acid compound is selected from the group consisting of biphenyldicarboxylic acid, biphenyldicarboxylic acid chloride and mixtures thereof and the carbonate precursor is phosgene.

* * * * *

UNITED STATES PATENT AND TRADEMARK OFFICE
CERTIFICATE OF CORRECTION

PATENT NO. : 5,045,610

DATED : September 3, 1991

INVENTOR(S) : Stephen E. Bales, Kenneth A. Burdett and Guo-Shuh J. Lee

It is certified that error appears in the above-identified patent and that said Letters Patent is hereby corrected as shown below:

On the Title page, right hand side under title "Abstract", line 7, the word " copolymestercarbonates " should correctly be spelled -- copolyestercarbonates --.

Column 11, Claim 7, line 13, " wherein R is a $C_1 \neq$ hydrocarbon; " should correctly read -- wherein R is a $C_{1-6}$ hydrocarbon; --.

Signed and Sealed this

Ninth Day of March, 1993

*Attest:*

STEPHEN G. KUNIN

*Attesting Officer*  *Acting Commissioner of Patents and Trademarks*